United States Patent
Madhvanath et al.

(10) Patent No.: US 10,425,769 B2
(45) Date of Patent: Sep. 24, 2019

(54) MEDIA NAVIGATION RECOMMENDATIONS

(71) Applicant: Hewlett-Packard Development Company, L.P., Houston, TX (US)

(72) Inventors: Sriganesh Madhvanath, Bangalore (IN); Sandeep Matti Prabhu, Bangalore (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 425 days.

(21) Appl. No.: 15/129,296

(22) PCT Filed: May 27, 2014

(86) PCT No.: PCT/US2014/039598
§ 371 (c)(1),
(2) Date: Sep. 26, 2016

(87) PCT Pub. No.: WO2015/152951
PCT Pub. Date: Oct. 8, 2015

(65) Prior Publication Data
US 2017/0118306 A1    Apr. 27, 2017

(30) Foreign Application Priority Data
Mar. 31, 2014 (IN) ............................ 1715/CHE/2014

(51) Int. Cl.
*H04W 4/029* (2018.01)
*H04W 4/02* (2018.01)
(Continued)

(52) U.S. Cl.
CPC .......... *H04W 4/029* (2018.02); *G01C 21/343* (2013.01); *G06K 9/00671* (2013.01);
(Continued)

(58) Field of Classification Search
CPC .... H04W 2/02–029; H04W 4/021–029; G01C 21/20–206; G06Q 10/109;
(Continued)

(56) References Cited

U.S. PATENT DOCUMENTS

| 8,015,183 B2 | 9/2011 | Frank et al. |
| 8,023,691 B2 | 9/2011 | Rodriguez et al. |

(Continued)

FOREIGN PATENT DOCUMENTS

| EP | 2482210 A2 | 8/2012 |
| KR | 20100013038 A | 2/2010 |

(Continued)

OTHER PUBLICATIONS

"Recommendations based on semantically enriched museum collections" by Wang et al published in 2008, (Year: 2008).*

(Continued)

*Primary Examiner* — Wing F Chan
*Assistant Examiner* — Rajeshwari Krishnan
(74) *Attorney, Agent, or Firm* — HP Inc. Patent Department

(57) ABSTRACT

In one example of the disclosure, navigation data indicative of sequencing and spatial relationship among a plurality of media hotspots is accessed. Each of the hotspots is included within a medium and includes a spatial address. Data indicative of a mobile device's detection of a target hotspot and the mobile device's provision of a display of the target hotspot is received via a network. A recommendation for navigation to an associated hotspot is determined based on the navigation data. The associated hotspot is an immediate predecessor or successor relative to the target hotspot. The recommendation is provided to the device for display.

20 Claims, 11 Drawing Sheets

(51) Int. Cl.
| | |
|---|---|
| *H04W 4/021* | (2018.01) |
| *G06K 9/00* | (2006.01) |
| *G01C 21/34* | (2006.01) |
| *H04L 12/24* | (2006.01) |
| *H04L 29/08* | (2006.01) |

(52) U.S. Cl.
CPC ............ *H04L 41/22* (2013.01); *H04L 67/327* (2013.01); *H04W 4/021* (2013.01); *H04W 4/025* (2013.01)

(58) Field of Classification Search
CPC ......... G06Q 30/0259; G06Q 50/00–01; G06Q 30/0255–0261; G09B 5/04–09; G06K 9/00208–00671; G06K 7/10099; G06K 7/10821
See application file for complete search history.

(56) References Cited

U.S. PATENT DOCUMENTS

| | | | |
|---|---|---|---|
| 8,090,146 | B2 | 1/2012 | Seshadri et al. |
| 8,180,844 | B1 | 5/2012 | Rhoads et al. |
| 8,447,144 | B2 | 5/2013 | King et al. |
| 8,573,475 | B2 | 11/2013 | Zuleeg |
| 8,606,493 | B1 | 12/2013 | Gold et al. |
| 8,611,919 | B2 | 12/2013 | Barnes, Jr. |
| 9,245,043 | B2* | 1/2016 | Liu ..................... G06F 16/9554 |
| 9,626,697 | B2* | 4/2017 | Rathus ............... G06Q 30/0259 |
| 2005/0224571 | A1 | 10/2005 | Kelley et al. |
| 2006/0168300 | A1 | 7/2006 | An et al. |
| 2007/0059674 | A1 | 3/2007 | Takano et al. |
| 2008/0266106 | A1* | 10/2008 | Lim ....................... G01C 21/20 340/572.7 |
| 2009/0262946 | A1 | 10/2009 | Dunko |
| 2010/0030465 | A1* | 2/2010 | Solkesz ................. G01C 21/20 701/533 |
| 2011/0212717 | A1* | 9/2011 | Rhoads ............... G06K 9/00664 455/420 |
| 2012/0105651 | A1 | 5/2012 | Lahcanski et al. |
| 2012/0110031 | A1 | 5/2012 | Lahcanski et al. |
| 2012/0184352 | A1* | 7/2012 | Detlefsen ............ G07F 17/3225 463/25 |
| 2012/0205439 | A1 | 8/2012 | Frad et al. |
| 2012/0234907 | A1 | 9/2012 | Clark et al. |
| 2012/0278242 | A1 | 11/2012 | Griffith |
| 2012/0278721 | A1 | 11/2012 | Beidel |
| 2013/0031593 | A1 | 1/2013 | Booth |
| 2013/0054698 | A1* | 2/2013 | Lee .................... G06Q 30/0259 709/204 |
| 2013/0112760 | A1 | 5/2013 | Schory et al. |
| 2013/0132477 | A1* | 5/2013 | Bosworth ............. G06Q 50/01 709/204 |
| 2013/0185657 | A1 | 7/2013 | Gunawardena et al. |
| 2013/0260795 | A1* | 10/2013 | Papakipos ............... H04W 4/21 455/456.3 |
| 2013/0262233 | A1* | 10/2013 | Bradley ............. G06Q 30/0267 705/14.64 |
| 2014/0022281 | A1* | 1/2014 | Georgeson ........... G06F 3/1454 345/633 |
| 2014/0029809 | A1* | 1/2014 | Rhoads .............. G06K 9/00442 382/112 |
| 2014/0336920 | A1* | 11/2014 | Burrell ................. G01C 21/206 701/409 |
| 2015/0001304 | A1* | 1/2015 | Todeschini ......... G06K 7/10811 235/462.24 |
| 2015/0016712 | A1* | 1/2015 | Rhoads .............. G06K 9/00208 382/154 |
| 2016/0203352 | A1* | 7/2016 | Marsico ................ G06Q 50/24 235/375 |

FOREIGN PATENT DOCUMENTS

| | | |
|---|---|---|
| WO | WO-2013158406 A2 | 10/2013 |
| WO | WO-2014024197 A1 | 2/2014 |

OTHER PUBLICATIONS

"RFID-Based Guide Gives Museum Visitors More Freedom" by Huang et al published in 2011 (Year: 2011).*
Google scholar search results for "augmented reality navigation recommendations" (Year: 2019).*
Google scholar search results for "Interactive multimedia museum guide Augmented Reality" (Year: 2019).*
Google scholar search results for "Interactive multimedia museum guide" (Year: 2019).*
Bulterman, et al. "Structured Multimedia Authoring", < http://pdf.aminer.org/ ~ 2005 ~ 25 pages.
Chen, "Quicktime VR—An image-based Approach to Virtual Environment Navigation", <http://www.cs.columbia.edu/, 1995 ~ 10 pages.
Knight, "Virtual Software in Reality", < http://etheses.dur.ac.uk/4244/1/4244_1764.pdf >, 2000 ~ First 13 pages of 205 pages.
Muller, E.I., Scan Anything and Let Your Phone Do the Rest, (Web Page), Oct. 25, 2011, <http://www.technologyreview.com/ ~ 3 pages.
Scanlife, "Analytics Engine," Jan. 8, 2014, <http://www.scanlife.com/analytics-engine> 2 pages.
Scanlife, "Code Actions," Jan. 8, 2014, <http://www.scanlife.com/code-actions> ~ 3 pages.
Scanlife, "Helping Marketers Deliver Mobile Engagement with QR Codes on Steroids," Jan. 24, 2013, <http://www.scanlife.com/blog/~ 2 pages.
Scanlife, "QR Code Generation Pricing Plans: Enterprise" Jan. 8, 2014, <http://www.scanlife.com/pricing> 3 pages.
Scanlife, "ScanLife QR Code Creation Plans," Jan. 8, 2014, <http://www.scanlife.com/pricing> 2 pages.
TechSmith.com, "Add Interactive Hotspots to Your Video," (Web page), retrieved on Jun. 9, 2014 at http://www.techsmith.com/ ~ 5 pages.

* cited by examiner

MEDIA NAVIGATION RECOMMENDATIONS

BACKGROUND

Digital watermarking can be utilized as a steganographic technique to embed digital information data into a noisy signals, such as an images displayed or printed upon a medium. The watermarks may be applied to the image in a manner that is invisible or non-intrusive to a user viewing the medium. Such watermarks are frequently used to verify the authenticity or integrity of the image at the medium. In other instances, the watermarks are used to identify an owner or provider of the medium.

DRAWINGS

DETAILED DESCRIPTION

Figure 1:
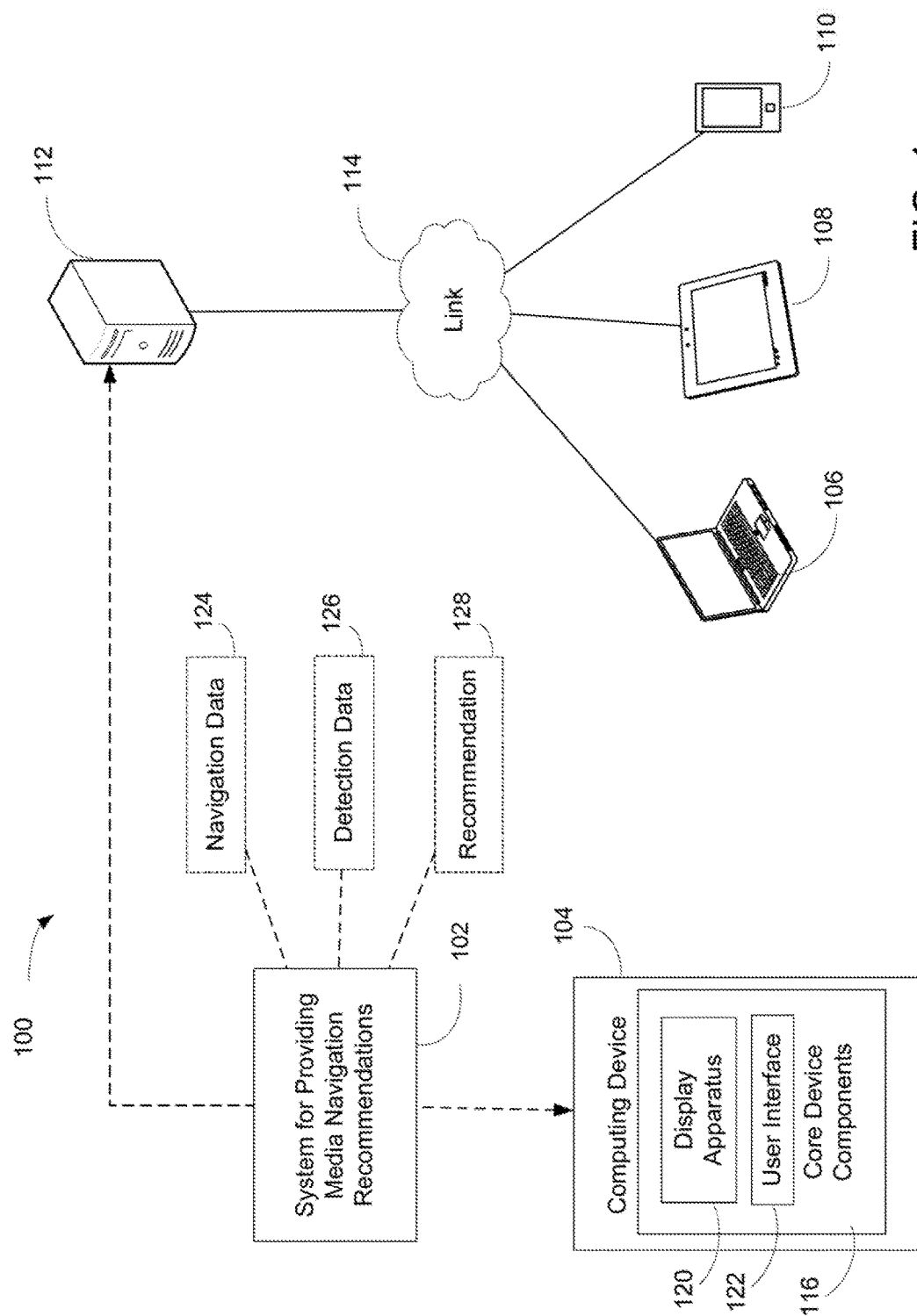
FIG. 1 is a block diagram depicting an example environment in which various embodiments may be implemented.

Introduction:

Some digital watermarks may be encoded with digital information in a manner such that when scanned by or otherwise detected certain mobile computing devices, e.g. a smartphone or tablet computer with a camera, a user experience may be provided at the smartphone with respect to a target watermark. In examples, the user experience may be providing information in text, image, video, audio or other digital format to the user in response to the user having used the mobile device to scan a specific point or region of the image at the medium. Such specific points that trigger a providing of digital information at a mobile device, following being scanned by the mobile device, are generally referred to herein as "hotspots." Such text, image, video, audio, or other digital format information provided in response to a mobile device detecting a hotspot is referred to generally herein as a "user experience payoff." Further, in some scenarios a user may be desire to navigate hotspots across a collection of media. For example, a museum may have a collection of classical painting media, and each painting medium may have multiple points of interest with accompanying commentary.

However when the embedded hotspots are covert (invisible, or nearly invisible) in order to prevent defacing or detracting from media, a mobile device user may not be aware that the hotspots exist or that the associated payoffs are possible. In other situations, a mobile device user may be aware that hotspots exist, but is without knowledge of how to locate them and navigate between or among the hotspots to effect a payoff. In yet other situations, a user may be aware that hotspots exist, but may be overwhelmed as the number of hotspot options presented greatly outnumber the set of hotspots that the user has an interest in, or greatly outnumbers the amount of time available for the user to navigate hotspots within the media.

To address these issues, various embodiments described in more detail below provide for a system and a method to provide media navigation recommendations. In an example, navigation data is accessed, the data indicative of sequencing and spatial relationship between or among a plurality of media hotspots. Each of the hotspots is included within a medium and each includes a spatial address relative to navigation of a medium or multiple media. Detection data is received, the detection data indicative of a mobile device's detection of a target hotspot and the mobile device's provision of a display of the target hotspot. Based upon the received navigation data, a recommendation for navigation to an associated hotspot is determined. The associated hotspot is an immediate predecessor or successor relative to the target hotspot. The recommendation is then provided to the mobile device for display. In some examples, graphic user interfaces may be provided during an authoring mode to enable a medium author to define the plurality of media hotspots within a medium or across multiple media and to define the navigation data for the hotspots, the navigation data indicative of sequencing and spatial relationship between or among the defined hotspots.

The recommendation is to be provided to the mobile device, for the mobile device to cause to be displayed at display component within or connected to the mobile device.

In this manner, examples described herein may present an automated and efficient manner to enable provision of media navigation recommendations for users of mobile computing devices. Disclosed examples provide a method and system to can enable a user to, using the display of a mobile device such as a smartphone or tablet, consume augmented information embedded in a much larger medium object, by navigating through interactive hotspots within the medium in a structured way. Examples described herein may enable users to discover the presence and location of invisible, embedded hotspots in a medium object that would otherwise be imperceptible to the naked eye. Examples described herein may enable users to perform hotspot authoring and hotspot navigation authoring tasks, thereby linking rich narrative or other kinds of digital experiences to not only specific points of interest within and across media objects, but also along an intentional path of hotspots connect them according to user interest, time allotted, or other factors. Examples described herein enable hotspot navigation data and the determination of recommendations for navigation among hotspots to take place at the cloud. This allows for the provision of hotspot navigation recommendations to computing devices with low memory or low processing power, such as some camera phones.

The following description is broken into sections. The first, labeled "Environment," describes an environment in which various embodiments may be implemented. The second section, labeled "Components," describes examples of various physical and logical components for implementing various embodiments. The third section, labeled "Operation," describes steps taken to implement various embodiments.

Environment:

FIG. 1 depicts an example environment 100 in which embodiments may be implemented as a system 102 to provide media navigation recommendations. Environment 100 is show to include computing device 104, client devices 106, 108, and 110, and server device 112. Components 104-112 are interconnected via link 114.

Link 114 represents generally any infrastructure or combination of infrastructures configured to enable an electronic connection, wireless connection, other connection, or combination thereof, to enable data communication between components 104 106 108 110 112. Such infrastructure or infrastructures may include, but are not limited to, one or more of a cable, wireless, fiber optic, or remote connections via telecommunication link, an infrared link, or a radio frequency link. For example, link 114 may represent the internet, one or more intranets, and any intermediate routers, switches, and other interfaces. As used herein an "electronic connection" refers generally to a transfer of data between components, e.g., between two computing devices, that are connected by an electrical conductor. A "wireless connection" refers generally to a transfer of data between two components, e.g., between two computing devices, that are not directly connected by an electrical conductor. A wireless connection may be via a wireless communication protocol or wireless standard for exchanging data.

Client devices 106-110 represent generally any computing device with which a user may interact to communicate with other client devices and server device 112 via link 114. Server device 112 represents generally any computing device configured to serve an application and corresponding data for consumption by components 104-110.

Computing device 104 represents generally any computing device with which a user may interact to communicate with client devices 106-110 and/or server device 112 via link 114. Computing device 104 is shown to include core device components 116. Core device components 116 represent generally the hardware and programming for providing the computing functions for which device 104 is designed. Such hardware can include a processor and memory, a display apparatus 120, and a user interface 122. The programming can include an operating system and applications. Display apparatus 120 represents generally any combination of hardware and programming configured to exhibit or present a message, image, view, or other presentation for perception by a user, and can include, but is not limited to, a visual, tactile or auditory display. In examples, the display device may be or include a monitor, a touchscreen, a projection device, a touch/sensory display device, or a speaker. User interface 122 represents generally any combination of hardware and programming configured to enable interaction between a user and device 104 such that the user may effect operation or control of device 104. In examples user interface 122 may be, or include, a keyboard, keypad, or a mouse. In some examples, the functionality of display apparatus 120 and user interface 122 may be combined, as in the case of a touchscreen apparatus that may enable presentation of images at device 104, and that also may enable a user to operate or control functionality of device 104.

System 102, discussed in more detail below, represents generally a combination of hardware and programming configured to enable provision of media navigation recommendations. In an example, system 102 is to access navigation data 124 indicative of sequencing and spatial relationship among a plurality of media hotspots. Each hotspot is a hotspot included within a medium, and each includes a spatial address relative to navigation of a medium or multiple media. System 102 is to receive, via a network, detection data 126 indicative of a mobile device's detection of a target hotspot among the plurality of hotspots, and indicative of the mobile device's provision of a display of the target hotspot. System is 102 is to determine, based on the accessed navigation data, a recommendation 128 for navigation to an associated hotspot that is an immediate predecessor or successor relative to the target hotspot. System 102 is to provide the recommendation 128 to the mobile device for display.

In another example, system 102 may provide a graphic user interface to enable defining of a plurality of hotspots within a medium, with each hotspot including a spatial address relative to the medium. System 102 may provide a graphic user interface to enable defining of navigation data for the hotspots, the navigation data indicative of sequencing and spatial relationship between or among the defined hotspots. The navigation data is to, when detected by a mobile device via a camera, enable display of a target hotspot at a display component included within the mobile device. The navigation data is also to, following communication between the mobile device and a hotspot navigation server, enable determination of a recommendation for navigation to an associated hotspot that is an immediate predecessor or successor relative to the target hotspot.

In some examples, system 102 may be wholly integrated within core device components 116. In other examples, system 102 may be implemented as a component of any of computing device 104, client devices 104-110, or server device 112, where it may take action based in part on data received from core device components 116 via link 114. In other examples, system 102 may be distributed across computing device 104, and any of client devices 106-110, or server device 112. For example, components implementing the accessing of navigation data, the receiving of the detection data, and the determination of the recommendation for navigation to an associated hotspot may be included within a server device 112, and a component implementing the providing of the recommendation to a mobile device for display may be a component included within computing device 104. In another example, components implementing the providing a graphic user interface to enable defining of a plurality of hotspots within media may be included within computing device 104, and components implementing the providing of a graphic user interface to enable defining of navigation data for the hotspots may be included within computing device 106.

Other distributions of system 102 across computing device 104, client devices 106-110, and server device 112 are possible and contemplated by this disclosure. It is noted that all or portions of the system 102 to provide media navigation recommendations may also be included on client devices 106, 108 or 110.

Figure 2:
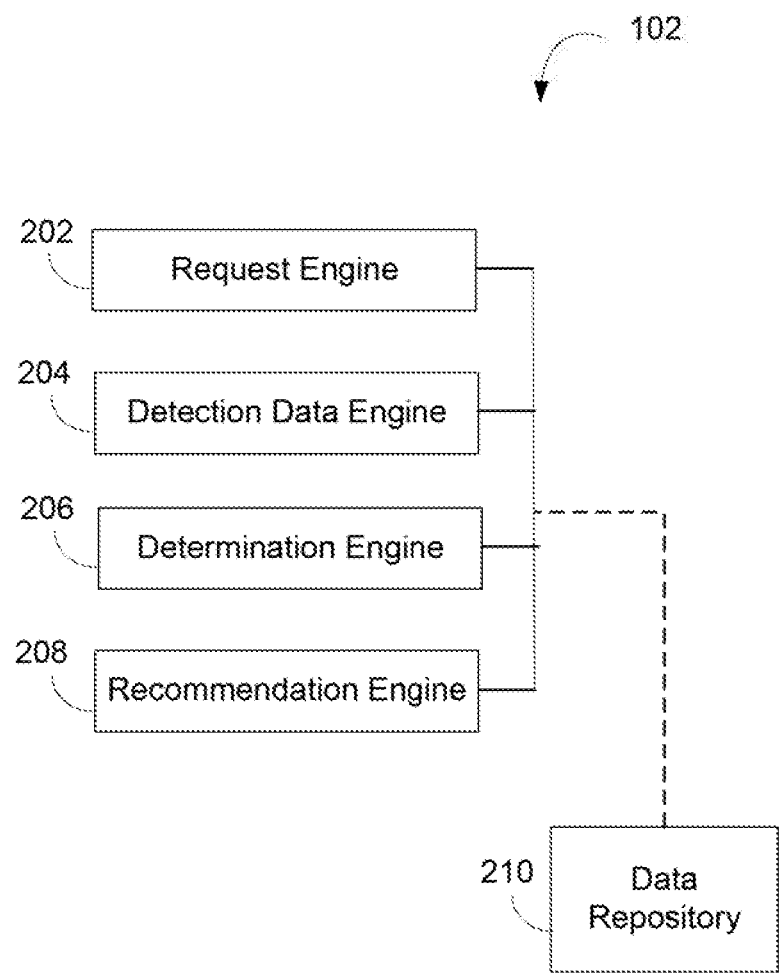
FIG. 2 is a block diagram depicting an example of a system to provide media navigation recommendations.

Components:

FIGS. 2, 3, 5, and 9 depict examples of physical and logical components for implementing various embodiments. In FIG. 2 various components are identified as engines 202, 204, 206, 208. In describing engines 202, 204, 208, 208, focus is on each engine's designated function. However, the term engine, as used herein, refers generally to a combination of hardware and programming configured to perform a designated function. As is illustrated later with respect to FIG. 4, the hardware of each engine, for example, may include one or both of a processor and a memory, while the programming may be code stored on that memory and executable by the processor to perform the designated function.

FIG. 2 is a block diagram depicting components of a system to provide media navigation recommendations 102. In this example, system 102 includes request engine 202, detection data engine 204, determination engine 206, and recommendation engine 208. In performing their respective functions, engines 202, 204, 206, 208 may access data repository 210. Repository 210 represents generally any memory accessible to system 102 that can be used to store and retrieve data.

Request engine 202 represents a combination of hardware and programming configured to access navigation data that indicates sequencing and spatial relationship for a plurality of media hotspots. As used herein, a "media hotspot" refers generally to a point or location within a medium that, when scanned by a mobile device with appropriate interpretive software, can trigger a providing of digital information at the mobile device. In an example, the hotspot may, utilizing steganographic techniques, be created by embedding digital information data into the image displayed or printed upon the medium. In an example, the hotspot may be a watermark that is applied to the image in a manner that is invisible or non-intrusive to a user viewing the medium.

In an example, the navigation data indicates a spatial relationship for each of the plurality of media hotspots. As used herein, a "spatial address" refers generally to an address or other identifier of a location that can be used to specify a location within an object (e.g. an image or medium), or across multiple media (e.g., images or media). In an example, the spatial address may be in the form of an "(x, y)" coordinate relative to a medium. In another example, the spatial address may be in the form of an abstract global position, e.g. a global positioning system ("GPS") coordinate.

In an example, the navigation data indicates a sequencing relationship for the media hotspots. As used herein, a "sequencing" refers generally to an order, structure, or progression for traversing, accessing or navigating among medial hotspots. In an example, data indicative of sequencing for navigation among hotspots within a medium, or between or among media, is data created as a result of a user hotspot authoring and navigation authoring operations that may be enabled by hotspot authoring engine and navigation authoring engines presented in this application.

Detection data engine 204 represents a combination of hardware and programming configured to receive via a network, e.g. link 114, data indicative of a mobile device's detection of a target hotspot via a camera and the mobile device's provision of a display of the target hotspot via a display component. As used herein, a "mobile device" and "mobile computing device" are used synonymously, and refer to any portable computing device. As used herein, "camera" refers generally to any combination of hardware and programming configured to record visual images in a digital format that can be stored, accessed, edited, displayed or printed by certain computing device. In examples, detection of a target hotspot via a camera may be detection using an integrated camera (e.g., a table computer or smartphone with an included camera), or detection using an attached camera (e.g., a camera that is electronically or wirelessly connected to the mobile device). As used herein, a "target hotspot" refers generally to a hotspot that has been specified, identified, brought into focus, marked, or otherwise set apart for consideration by a mobile device or a user of a mobile device. As used herein, a "display component" refers generally to a component for exhibiting or presenting for perception by a user, and includes, but is not limited to visual, auditory and tactile presentations.

Determination engine 206 represents a combination of hardware and programming configured to determine based on the navigation data a recommendation for navigation to an associated hotspot that is an immediate predecessor or successor relative to the target hotspot. As used herein, "navigation" refers generally to a user-initiated movement between or among hotspots within or across an image, a medium, multiple images or multiple media. In examples, a navigation action may be initiated by a user a number of methods, including but not limited to entering an identifier for the desired menu element from a keyboard, positioning a cursor by using a keyboard, mouse, or remote control, using an electromechanical input device, such as a light pen, touching a display screen with a finger, aligning a hotspot with a site or other targeting mechanism (e.g. within a viewfinder), or speaking to a voice-recognition system. As used herein, a "recommendation" for navigation between or among hotspots refers generally to any endorsement, advice, or direction. In an example, the recommendation may be made via graphic user interface display, at the mobile device, of an arrow or other icon that indicate direction. In another example, the recommendation may be made via making a hotspot that is invisible to the naked eye at a display component visible at the component for a period of time. In another example, the recommendation may be made via highlighting, illuminating, or otherwise identifying or specifying the associated hotspot within a display presented at a display component. In another example, the recommendation may be displayed as an audio recommendation, such as utilizing a speaker to cause aural presentation of a phrase (e.g. "go left") or via playing a sound at a speaker that is in a location near the associated hotspot so as to guide a user to the associated hotspot. In another example, the recommendation may be a recommendation made via a sensory means other than visual or audio means, e.g., via providing specific vibration patterns at a mobile device to provide navigation cues and cause a user to reposition the device in response to such vibration cues.

Recommendation engine 208 represents a combination of hardware and programming configured to, to responsive to the determination made by the determination engine 206, provide the determined recommendation to the device for display via the component. In an example, the recommendation provided to the mobile device may be a recommendation to be displayed to a user via the graphic user interface display. As discussed previous, in a particular example the recommendation may be to be visually displayed at the mobile device as an arrow or other icon that indicate a direction or path from the target hotspot to an associated hotspot.

In examples, the request engine 503 may cause the accessing of navigation data, the detection data engine 504 may cause the receipt of detection data from the mobile device, and/or the recommendation engine may cause the recommendation to be provided to the mobile device via a networking protocol. In examples, the networking protocol may include, but is not limited to Transmission Control Protocol/Internet Protocol ("TCP/IP"), HyperText Transfer Protocol ("HTTP"), Simple Mail Transfer Protocol ("SMTP"), Extensible Messaging and Presence Protocol ("XMPP") and/or Session Initiation Protocol ("SIP").

It is important to note that while this application primarily provides examples of proving media navigation recommendations with respect to hotspots included with a single medium, such an implementation is not exclusive. The disclosed embodiments also teach the providing of media navigation recommendations across a plurality of media objects, e.g., a collection of media. For example, a museum may have a collection of classical painting media, and each painting medium may have multiple points of interest with accompanying commentary. In another example, a city may have several tourist spots with signage media, and the signage media may in turn be augmented to provide information payoffs. In another example, a textbook may have a collection of page media, with each page medium having multiple hotspots linked to payoffs that provide educational content in the form of videos and quiz questions. In an example, when a recommendation for navigation is to an associated hotspot in a second medium that is a different medium than the medium including the target hotspot the position of the new medium and its recommended hotspot may be indicated in the mobile device's display via a GPS coordinate, or via providing a directional arrow that is of a special shape or color to indicate a transition to the second medium. When the user arrives at the second medium, the user can point the camera associated with the mobile device at a new target hotspot with the second medium, so as to cause determination and provision of another hotspot recommendation. In this manner, a tour across multiple media objects can be provided via provision of hotspot navigation recommendations.

Figure 3:
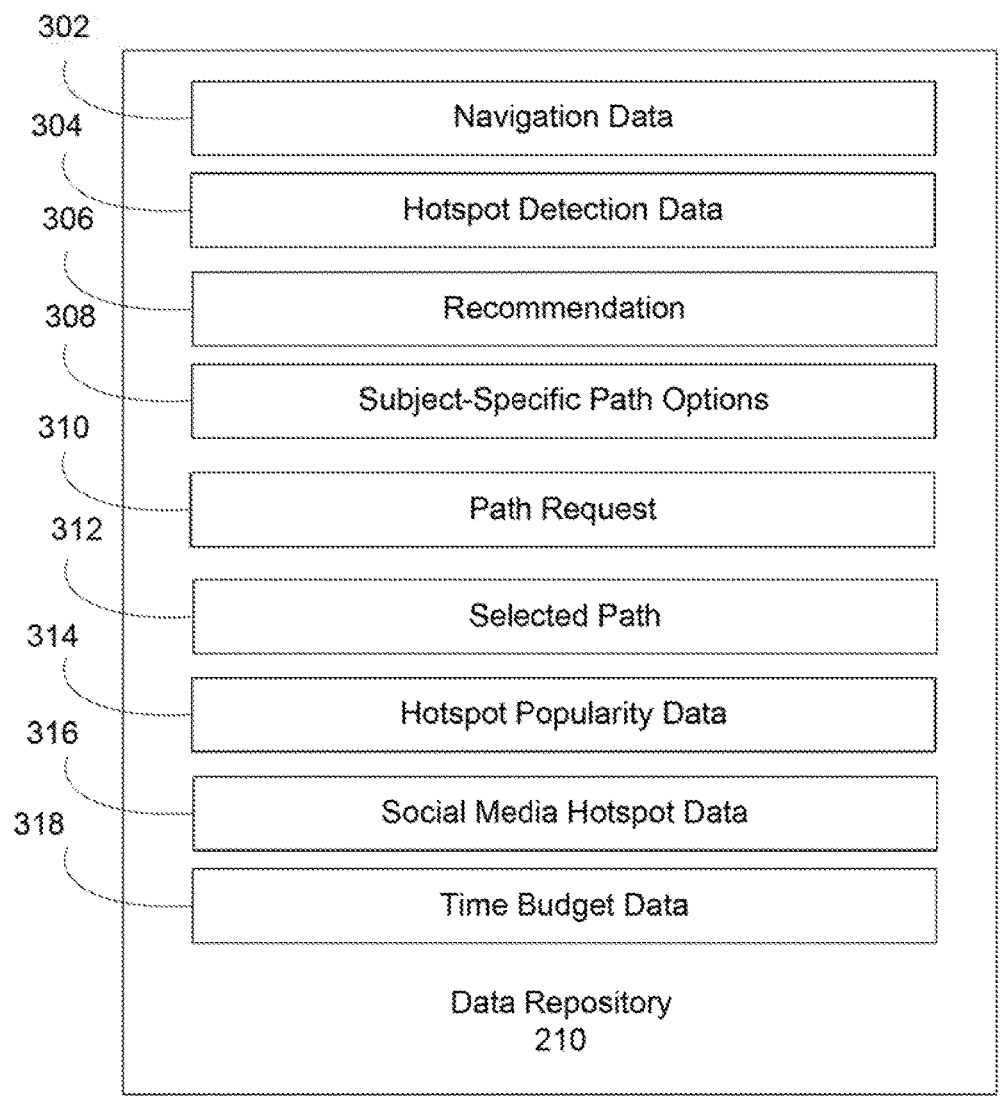
FIG. 3 is a block diagram depicting an example data structure for a system to provide media navigation recommendations.
Figure 4:
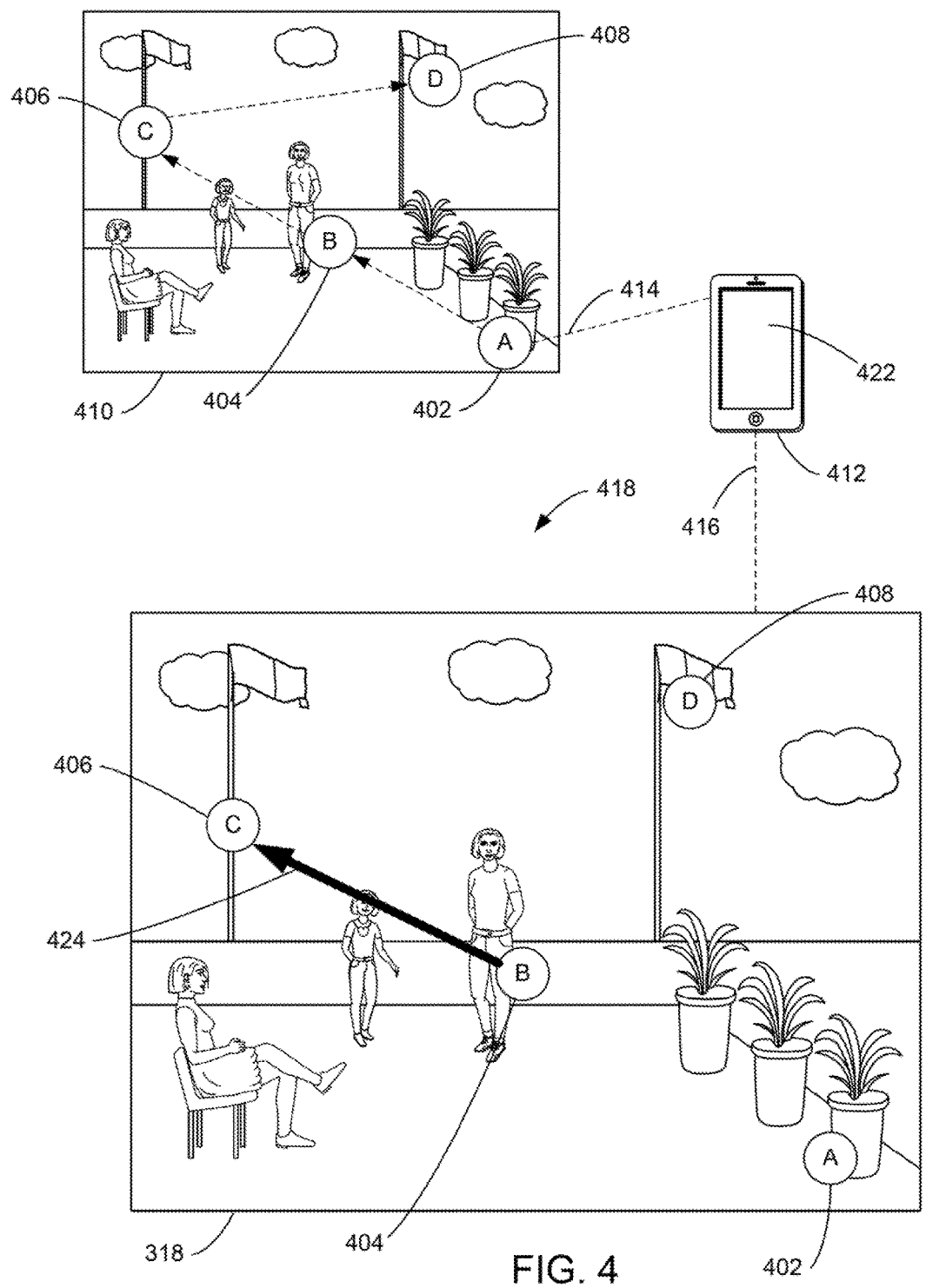
FIG. 4 illustrates an example of providing media navigation recommendations.

FIG. 3 depicts an example implementation of data repository 210. In this example, repository 210 includes navigation data 302, hotspot detection data 304, a recommendation 306, subject-specific path options 308, a path request 310, a selected path, 312, hotspot popularity data 314, social media hotspot data 316, and time budget data 318. FIG. 4, in view of FIGS. 2 and 3, illustrates an example of providing media navigation recommendations. In an example, request engine 202 (FIG. 2) accesses via a network (e.g., link 114, FIG. 1) navigation data 302. The navigation data 302 is data indicative of sequencing and spatial relationship among a plurality of media hotspots 402 404 406 408. Each of the hotspots is included within a medium 410 and includes data indicative of a spatial address.

Continuing with the example of FIG. 4, in view of FIGS. 2 and 3, detection data engine 204 (FIG. 2) receives, via link 114 (FIG. 1) hotspot detection data 304 indicative of a mobile device's 412 detection 414 of a target hotspot 404 and the mobile device's 412 provision 416 of a display 418 of at least a portion of the medium 410, the display including target hotspot 404. In this example, the mobile device 412 includes a camera, a display component 422, and image recognition programming to recognize the hotspots 402 404 406 408. Detection of a target hotspot by the camera triggers an information display relating to a subject of the medium 410 at the display component 422. In examples, the information display may be a user experience payoff in the form of a providing of digital information at a mobile device 412. In examples, the payoff may be in the form of the mobile device displaying text, image, video, audio, or other digital format.

Continuing with the example of FIG. 4, in view of FIGS. 2 and 3, determination engine 206 (FIG. 2) determines based on the navigation data 302 a recommendation 306 for navigation to an associated hotspot that is an immediate successor 406 relative to the target hotspot 404. In another example, the recommendation 306 may be for navigation to an associated hotspot that is an immediate predecessor 402 relative to the target hotspot 404.

Continuing with the example of FIG. 4, in view of FIGS. 2 and 3, recommendation engine 208 (FIG. 2) provides the determined recommendation 306 to the mobile device 412 for display 418. In this example, the determined recommendation 306 includes instructions to present directional information in the display 418. In another example, the mobile device 412 may include interpretive programming configured to cause presentation of a directional information arrow in the display 418 based upon the received recommendation 306.

Continuing with the example of FIG. 4, in view of FIGS. 2 and 3, first directional information is in the form of a directional arrow 424, the first 424 arrow to point from the target hotspot 404 toward an associated successor hotspot 406 that is the immediate successor to the target hotspot 404 according to the navigation data 302. In another example not illustrated at FIG. 4, directional information might be in the form of a directional arrow 424 that points from the target hotspot 404 toward an associated predecessor hotspot 402 that is the immediate predecessor to the target hotspot 404 according to the navigation data 302.

In an example, determination engine 206 (FIG. 2) may be configured to determine a plurality of subject-specific path options 308 involving subsets of the plurality of hotspots 402 404 406 408, and to provide the path options 308 to the mobile device 412 for display. In this example, the recommendation engine 208 (FIG. 2) may be configured to receive a path request 310 for a particular subject-specific path 312 selected by a user from among the options, and to provide that selected path 312 including the recommendation 306 to the mobile device 412. In an example, the determination engine 206 (FIG. 2) may determine the path options 308 based upon data indicative of preferences of a user of the mobile device 412. In one example, the preference data may be obtained by the determination engine 206 (FIG. 2) according to a graphic user interface direct inquiry interface to which a user inputs preferences. In another example, the preference data may be obtained by the determination engine 206 according to data indicative of previous navigation among hotspots by a user of the mobile device. In the example illustrated at FIG. 4, data indicative of high user interaction with hotspots associated with the plants portrayed on the medium 410 may be utilized by the determination engine 206 to determine a plurality of disparate path options to be presented to a user at the mobile device 412. In an example, a path options to be presented may relate to hotspot "A" 402 (a hotspot associated with the plants in the foreground of the medium 410), with the path option involving navigation among a subset of the plurality of hotspots at the medium 410. For instance, a determined path options associated with hotspot "A" 402 might be a first a hotspot path specific to the subject "how to establish perspective when painting." In another example, a path options to be presented may relate to hotspot "D" 408 (a hotspot associated with the flag in the background of the medium 410), with the path option being a second hotspot path specific to the subject "popular tourist destinations in France."

In another example, the determination engine 206 (FIG. 2) may be configured to receive, e.g., from a variety of mobile computing devices that may or may not include device 412, hotspot popularity data 314 that is indicative of relative popularity of the plurality of hotspots according to user preferences or user navigation among the hotspots. In this example, determination engine 206 may determine the recommendation 306 based, at least in part, on the hotspot popularity data 314.

In another example, the determination engine 206 (FIG. 2) may be configured to determine the recommendation 306 based at least in part upon accessed or received social media hotspot data 316. In an example, the social media hotspot data 316 includes information the identity of a first user that interacts with the display 418 at the mobile device 412, information regarding the first user's social media friendship relationships, and hotspot recommendations that are or were made by friends of the first user. As used herein, "friend" refers generally to an online trust relationship, and is not meant to be an exclusive term. Example of other terms that may indicate an online trust relationship, and thus may synonyms for "friend" in certain contexts, include "follower, "classmate", and "connection." Accordingly, as used in this specification and the appended claims, "friend" includes these and any other designations of trust utilized by social media applications and services.

In another example, the determination engine 206 (FIG. 2) may be configured to access or receive time budget data 318 that is indicative of a time budget for a user, and to determine the recommendation 306 based at least in part upon the time budget. As used herein, a "time budget" refers generally to an estimate of time available for a user to navigate hotspots within one or more media. In an example, time budget data 318 may include data indicative of a schedule for the user, e.g. data associated with a calendar application utilized by the user, or data provided by the user via a graphic user interface caused to be provided, e.g., at mobile device 412, by determination engine 206. In another example, time budget data 318 may include data indicative of a schedule for a venue at which the medium 410 is being displayed. For instance, if the medium 410 is housed in an art gallery building, and the scheduled hours for access to the gallery are 10 am to 6 pm, the time budget data may include the gallery schedule information.

In the foregoing discussion of FIGS. 2-4, engines 202, 204, 206, 208 were described as combinations of hardware and programming. Engines 202, 204, 206, 208 may be implemented in a number of fashions. Looking at FIG. 5 the programming may be processor executable instructions stored on a tangible memory resource 502 and the hardware may include a processing resource 504 for executing those instructions. Thus memory resource 502 can be said to store program instructions that when executed by processing resource 504 implement system 102 of FIGS. 1 and 2.

Memory resource 502 represents generally any number of memory components capable of storing instructions that can be executed by processing resource 504. Memory resource 502 is non-transitory in the sense that it does not encompass a transitory signal but instead is made up of more or more memory components configured to store the relevant instructions. Memory resource 502 may be implemented in a single device or distributed across devices. Likewise, processing resource 504 represents any number of processors capable of executing instructions stored by memory resource 502. Processing resource 504 may be integrated in a single device or distributed across devices. Further, memory resource 502 may be fully or partially integrated in the same device as processing resource 504, or it may be separate but accessible to that device and processing resource 504.

In one example, the program instructions can be part of an installation package that when installed can be executed by processing resource 504 to implement system 102. In this case, memory resource 502 may be a portable medium such as a CD, DVD, or flash drive or a memory maintained by a server from which the installation package can be downloaded and installed. In another example, the program instructions may be part of an application or applications already installed. Here, memory resource 502 can include integrated memory such as a hard drive, solid state drive, or the like.

Figure 5:
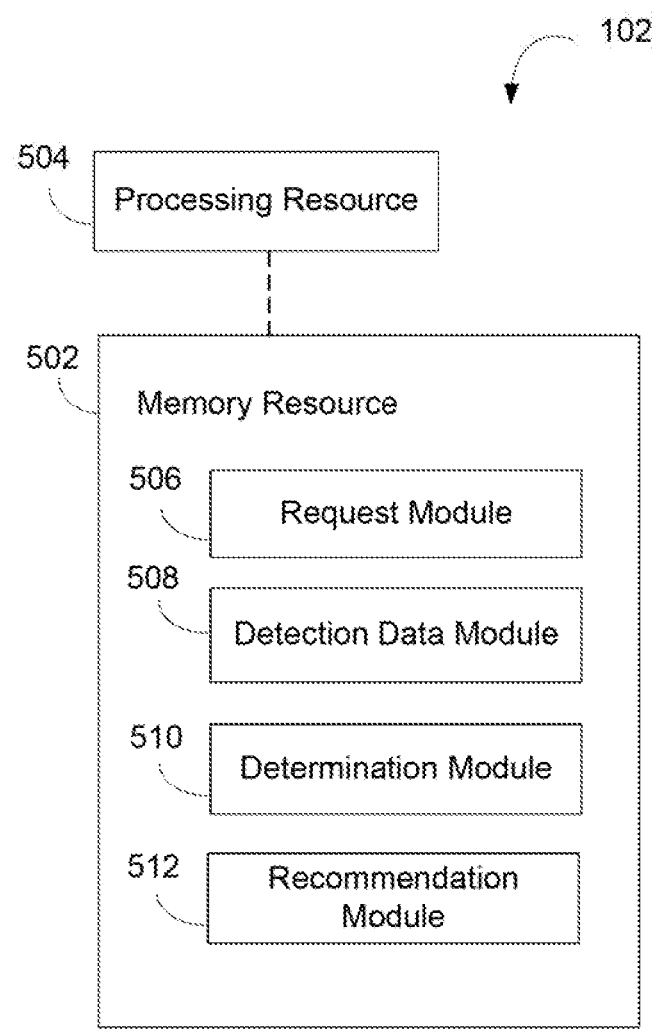
FIG. 5 is a block diagram depicting a memory resource and a processing resource according to an example.

In FIG. 5, the executable program instructions stored in memory resource 502 are depicted as request module 506, detection data module 508, determination module 510, and recommendation module 512. Request module 506 represents program instructions that when executed by processing resource 504 may perform any of the functionalities described above in relation to request engine 202 of FIG. 2. Detection data module 508 represents program instructions that when executed by processing resource 504 may perform any of the functionalities described above in relation to detection data engine 204 of FIG. 2. Determination module 510 represents program instructions that when executed by processing resource 504 may perform any of the functionalities described above in relation to determination engine 206 of FIG. 2. Recommendation module 512 represents program instructions that when executed by processing resource 504 may perform any of the functionalities described above in relation to recommendation engine 208 of FIG. 2.

Figure 6:
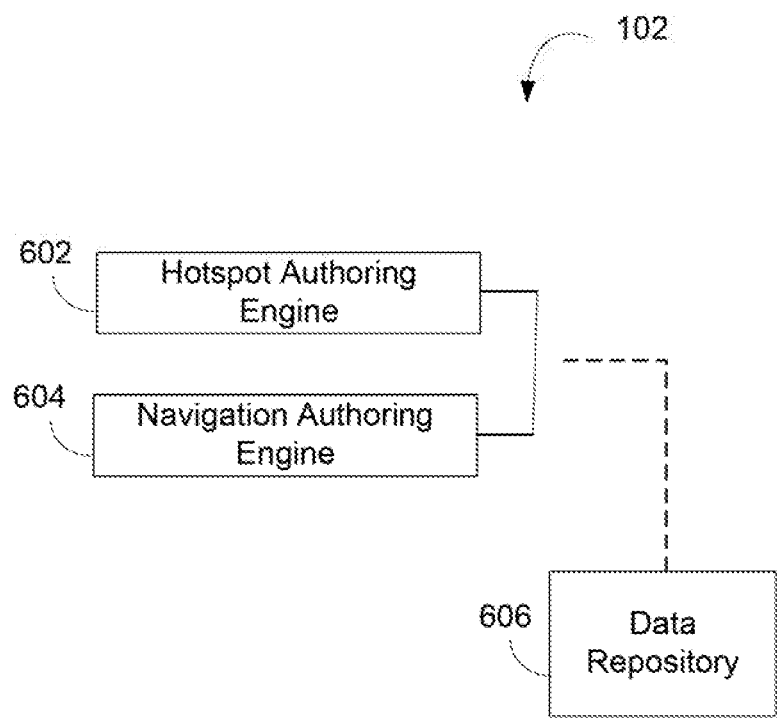
FIG. 6 is a block diagram depicting an example of a system to provide media navigation recommendations.

FIG. 6 is a block diagram depicting components of system to provide media navigation recommendations 102. In this example, system 102 includes hotspot authoring 602 and navigation authoring engine 604. In performing their respective functions, engines 602 604 may access data repository 606. Repository 606 represents generally any memory accessible to system 102 that can be used to store and retrieve data.

Figure 7:
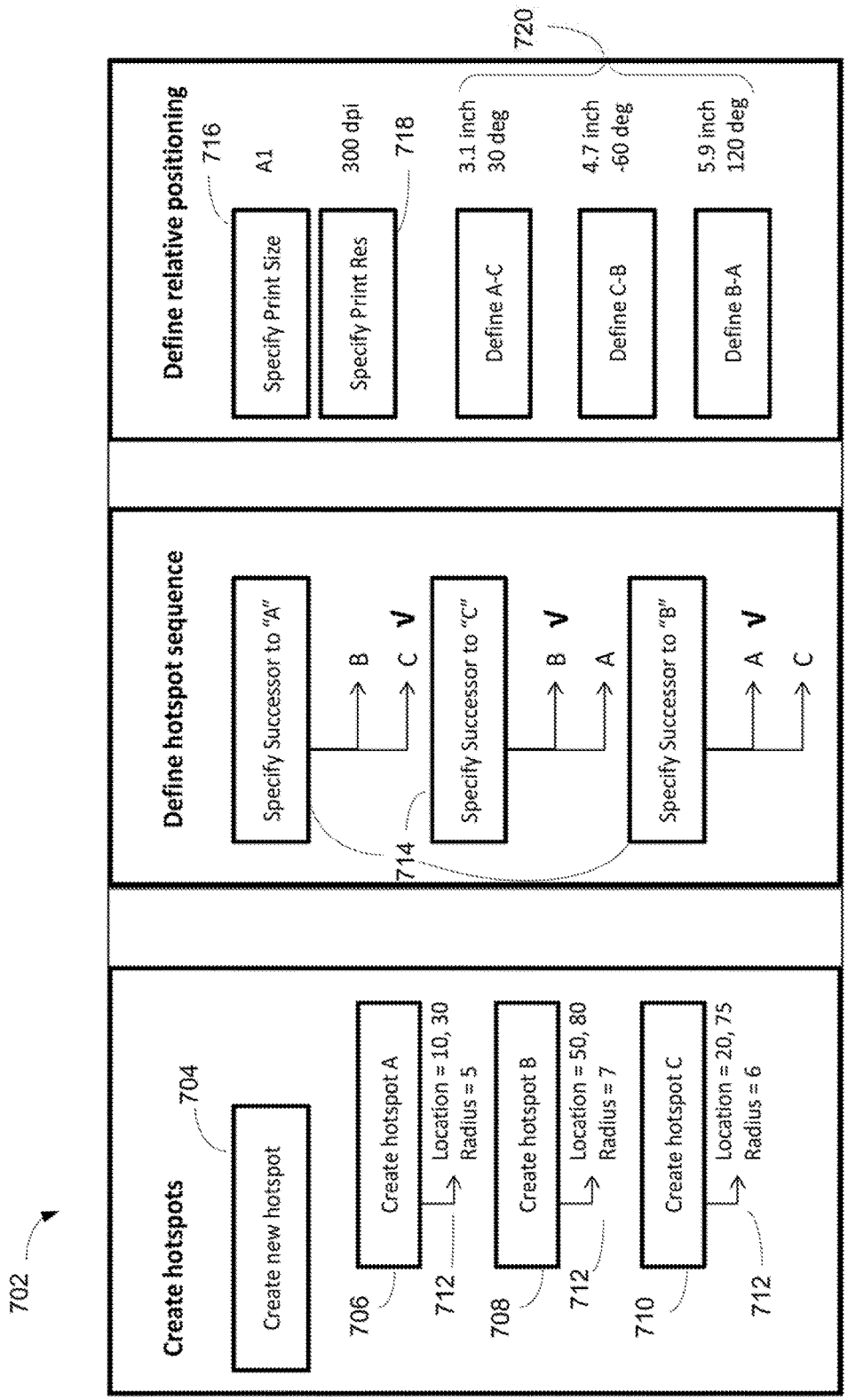
FIGS. 7, 8A and 8B illustrate an example of providing media navigation recommendations.
Figures 8A, 8B:
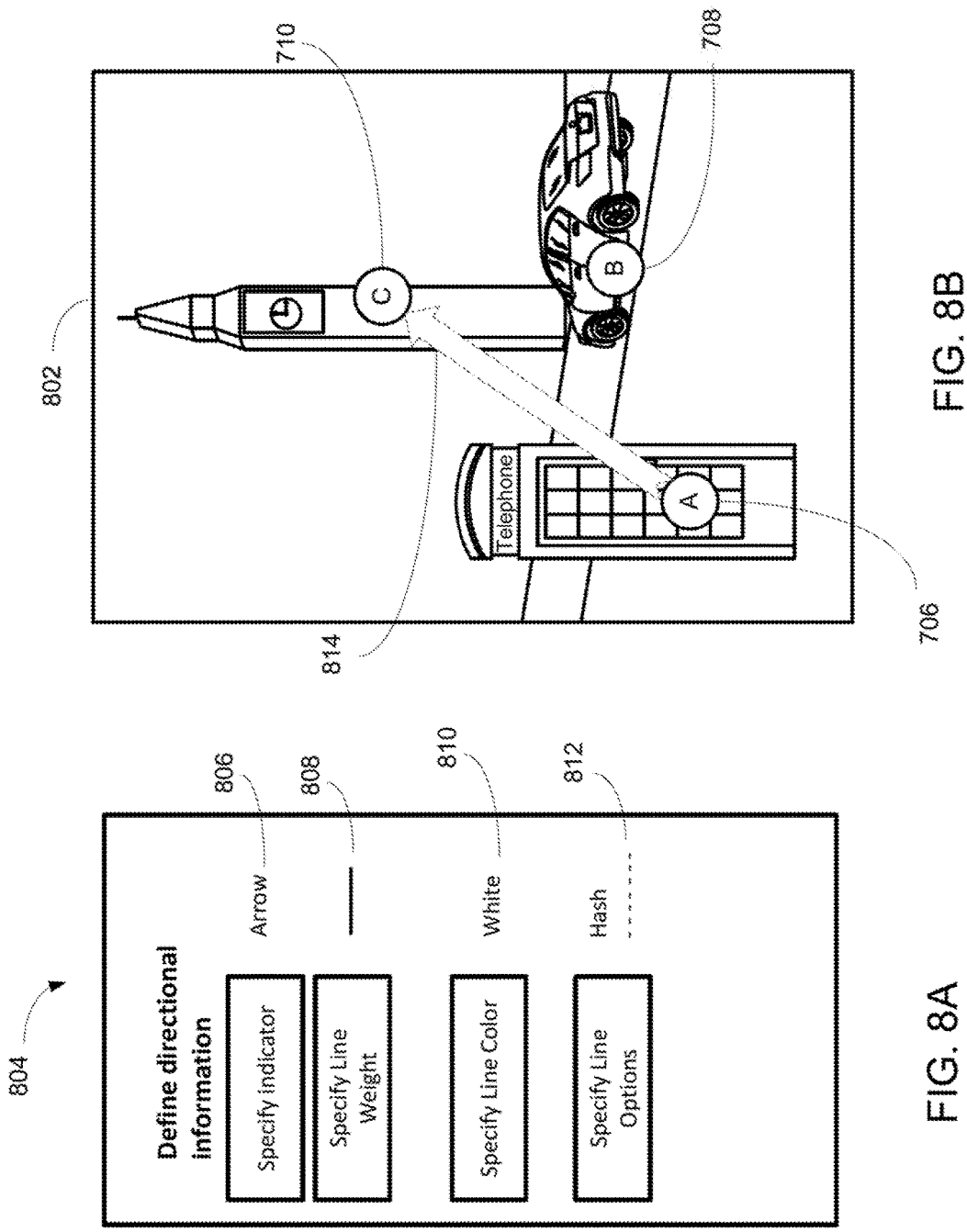

FIG. 7, in view of FIGS. 6, 8A and 8B, illustrates an example of providing media navigation recommendations. In an example, hotspot authoring engine 602 (FIG. 6) represents a combination of hardware and programming configured to acquire via a graphic user interface 702, or a set of graphic user interfaces, establishment data 704 that specifies a plurality of media hotspots (hotspot "A" 706, hotspot "B" 708, and hotspot "C" 710) to be incorporated within a medium and receiving spatial addresses 712 for the hotspots. The establishment data is interpretable by interpretive programming of a mobile computing device to detect a target hotspot among the plurality.

Navigation authoring engine 604 represents a combination of hardware and programming configured to acquire via a graphic user interface 702 navigation data indicative of sequencing and spatial relationships 714 among the plurality of hotspots, such that the navigation data is usable by the server to determine a recommendation for navigation from the target hotspot to an associated hotspot.

Continuing with the example of FIGS. 6 and 7, in view of FIGS. 8A and 8B, in this example a user has provided via graphic user interface 702, and hotspot navigation engine 606 has acquired, navigation data for the hotspots such that hotspot "C" 710 is specified as a successor to hotspot "A" 706, hotspot "B" 708 is specified as a successor to hotspot "C" 710, and hotspot "A" 706 is specified as a successor to hotspot "B" 708. Further, the provided graphic user interface 702 enables a user to provide, and the navigation authoring engine to acquire, additional graphics details for the defined hotspots, including defining a print size 716, a print resolution 718, and relative positioning of hotspot "A" 706, hotspot "B" 708, and hotspot "C" 720. The spatial relationship and sequencing relationship hotspot navigation data is to, when detected by a mobile device via a camera, enable display of a target hotspot at a display component included within the mobile device.

Turning to FIG. 8A, in an example navigation authoring engine 606 may be configured to acquire, via a graphic user interface 804, a definition or description of the type of directional information to be included within a recommendation for navigation from a target hotspot to an associated hotspot. In this example, a user has specified that an arrow-type indicator 806 is to serve as the directional information to be displayed at the mobile device, and that the arrow shall be of a specific line weight 808, a specified color 810 (white), and a specified style 812 (hash line).

FIG. 8B illustrates an example of a display of the hotspots defined via the hotspot authoring engine 602 and the hotspot navigation engine 604. In this example, hotspot "A" 706 has been identified by a user of a mobile device as a target hotspot, and responsive to the identification of hotspot "A" 706 as the target hotspot an associated immediate predecessor hotspot "B" 708 and an associated immediate successor hotspot "C" 710 are revealed within the display for user viewing, along with a connecting arrow 814 such that hotspot "C" 710 is specified as a successor to hotspot "A" 706.

In the foregoing discussion of FIGS. 6, 7, 8A and 8B, engines 602 604 were described as combinations of hardware and programming. Engines 602 604 may be implemented in a number of fashions. Looking at FIG. 9 the programming may be processor executable instructions stored on a tangible memory resource 902 and the hardware may include a processing resource 904 for executing those instructions. Thus memory resource 902 can be said to store program instructions that when executed by processing resource 904 implement system 102 of FIGS. 1, 2 and 6.

In one example, the program instructions can be part of an installation package that when installed can be executed by processing resource 904 to implement system 102. In this case, memory resource 902 may be a portable medium such as a CD, DVD, or flash drive or a memory maintained by a server from which the installation package can be downloaded and installed. In another example, the program instructions may be part of an application or applications already installed. Here, memory resource 902 can include integrated memory such as a hard drive, solid state drive, or the like.

Figure 9:
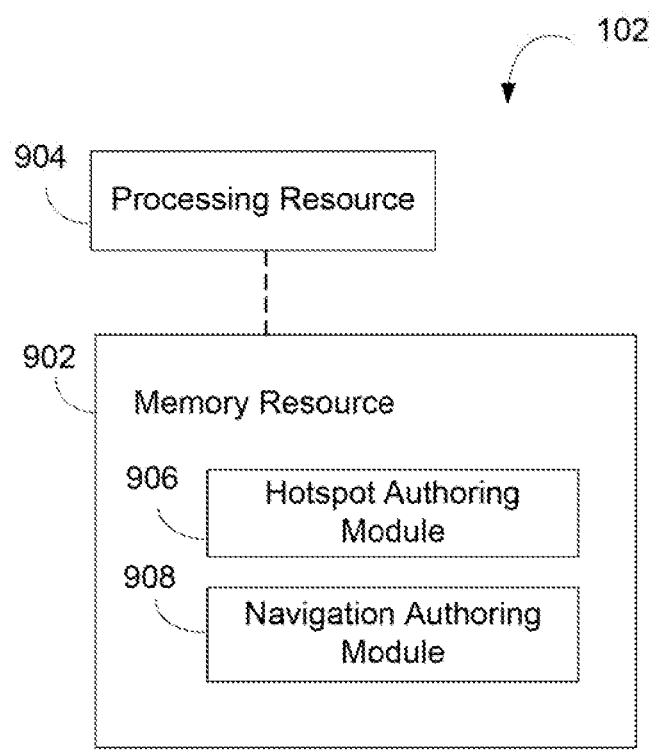
FIG. 9 is a block diagram depicting a memory resource and a processing resource according to an example.

In FIG. 9, the executable program instructions stored in memory resource 902 are depicted as hotspot authoring module 906 and hotspot navigation module 908. Hotspot authoring module 906 represents program instructions that when executed by processing resource 904 may perform any of the functionalities described above in relation to hotspot authoring engine 202 of FIG. 2. Hotspot navigation module 908 represents program instructions that when executed by processing resource 904 may perform any of the functionalities described above in relation to hotspot navigation engine 206 of FIG. 2.

Figure 10:
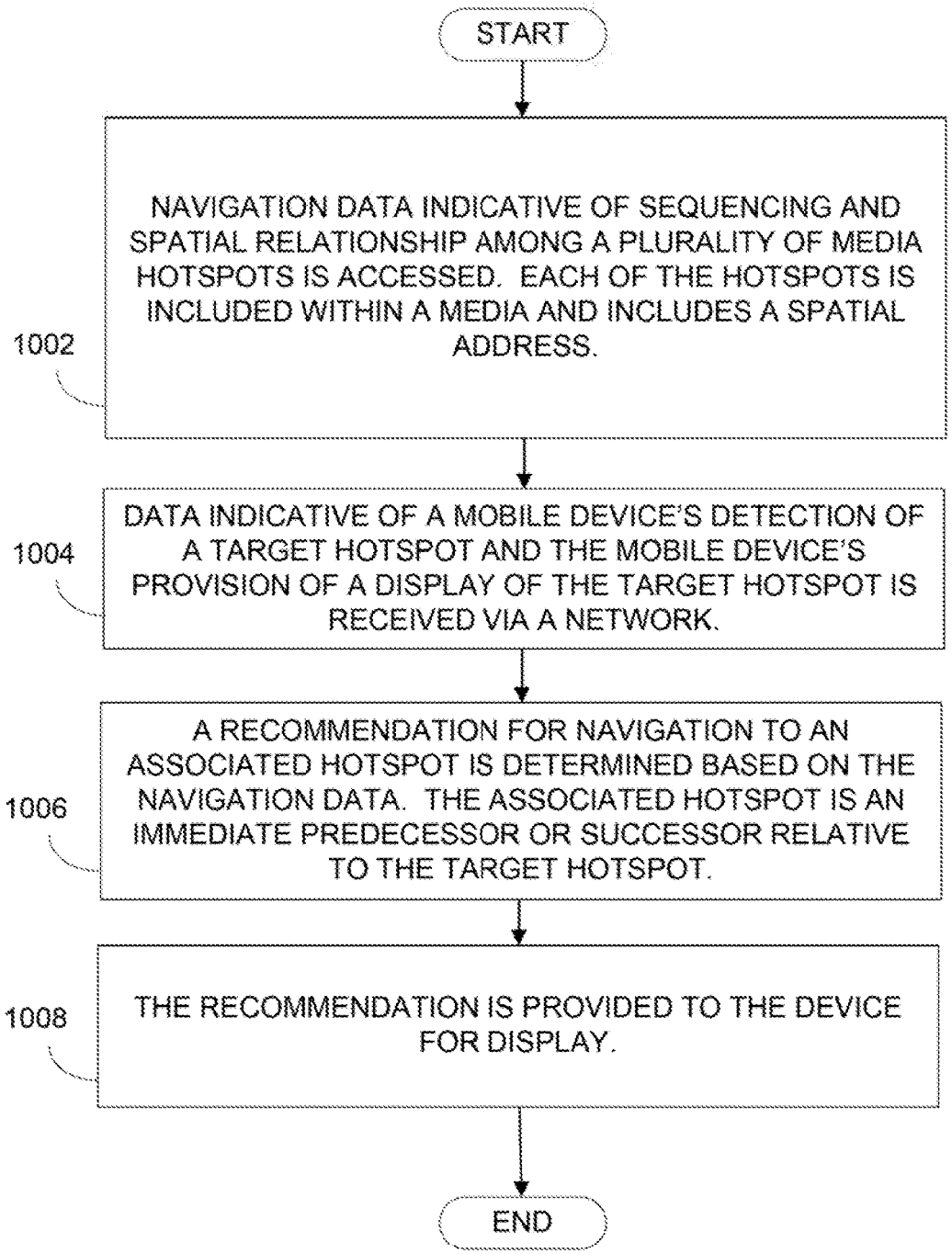
FIG. 10 is a flow diagram depicting steps taken to implement an example.

FIG. 10 is a flow diagram of steps taken to implement a method for providing media navigation recommendations. In discussing FIG. 10, reference may be made to the components depicted in FIGS. 2 and 5. Such reference is made to provide contextual examples and not to limit the manner in which the method depicted by FIG. 10 may be implemented. Navigation data indicative of sequencing and spatial relationship among a plurality of media hotspots is accessed. Each hotspot is included within a medium and includes a spatial address (block 1002). Referring back to FIGS. 2 and 5, request engine 602 (FIG. 2) or request module 506 (FIG. 5), when executed by processing resource 504, may be responsible for implementing block 1002.

Data indicative of a mobile device's detection of a target hotspot and the mobile device's provision of a display of the target hotspot is received via a network (block 1004). Referring back to FIGS. 2 and 5, detection data engine 204 (FIG. 2) or detection data module 508 (FIG. 5), when executed by processing resource 504, may be responsible for implementing block 1004.

A recommendation for navigation to an associated hotspot is determined based on the navigation data. The associate hotspot is an immediate predecessor or successor relative to the target hotspot (block 1006). Referring back to FIGS. 2 and 5, determination engine 206 (FIG. 2) or determination module 510 (FIG. 5), when executed by processing resource 504, may be responsible for implementing block 1006.

The recommendation is provided to the device for display (block 1008). Referring back to FIGS. 2 and 5, recommendation engine 208 (FIG. 2) or recommendation module 512 (FIG. 5), when executed by processing resource 504, may be responsible for implementing block 1008.

Figure 11:
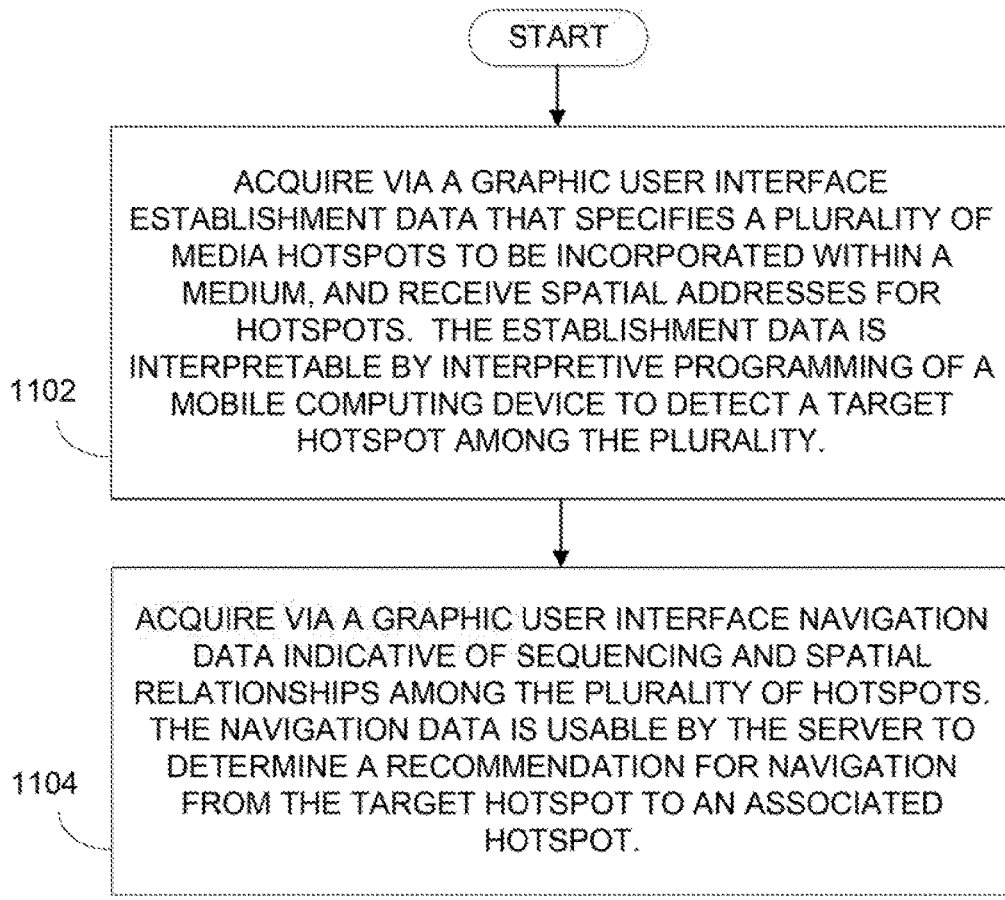
FIG. 11 is a flow diagram depicting steps taken to implement an example.

FIG. 11 is a flow diagram of steps taken to implement a method for providing media navigation recommendations. In discussing FIG. 11, reference may be made to the components depicted in FIGS. 6 and 9. Such reference is made to provide contextual examples and not to limit the manner in which the method depicted by FIG. 11 may be implemented. Establishment data is acquired via a graphic user interface. The establishment data specifies a plurality of media hotspots to be incorporated within a medium. Spatial addresses for hotspots are received via the interface. The establishment data is interpretable by interpretive programming of a mobile computing device to detect a target hotspot among the plurality (block 1102). Referring back to FIGS. 6 and 9, hotspot authoring engine 602 (FIG. 6) or hotspot authoring module 906 (FIG. 9), when executed by processing resource 904, may be responsible for implementing block 1102.

Navigation data is acquired via a graphic user interface. The navigation data is indicative of sequencing and spatial relationships among the plurality of hotspots. The navigation data is usable by the server to determine a recommendation for navigation from the target hotspot to an associated hotspot (block 1104). Referring back to FIGS. 6 and 9, hotspot navigation engine 604 (FIG. 6) or hotspot navigation module 908 (FIG. 9), when executed by processing resource 904, may be responsible for implementing block 1104.

CONCLUSION

FIGS. 1-11 aid in depicting the architecture, functionality, and operation of various embodiments. In particular, FIGS. 1-3, 5-6, and 9 depict various physical and logical components. Various components are defined at least in part as programs or programming. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s). Embodiments can be realized in any memory resource for use by or in connection with processing resource. A "processing resource" is an instruction execution system such as a computer/processor based system or an ASIC (Application Specific Integrated Circuit) or other system that can fetch or obtain instructions and data from computer-readable media and execute the instructions contained therein. A "memory resource" is any non-transitory storage media that can contain, store, or maintain programs and data for use by or in connection with the instruction execution system. The term "non-transitory" is used only to clarify that the term media, as used herein, does not encompass a signal. Thus, the memory resource can comprise any one of many physical media such as, for example, electronic, magnetic, optical, electromagnetic, or semiconductor media. More specific examples of suitable computer-readable media include, but are not limited to, hard drives, solid state drives, random access memory (RAM), read-only memory (ROM), erasable programmable read-only memory, flash drives, and portable compact discs.

Although the flow diagrams of FIGS. 10 and 11 show a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims. All of the features disclosed in this specification (including any accompanying claims, abstract and drawings), and/or all of the steps of any method or process so disclosed, may be combined in any combination, except combinations where at least some of such features and/or steps are mutually exclusive.

What is claimed is:

1. A non-transitory computer readable medium storing instructions executable by a processor circuit to implement a system to provide media navigation recommendations, wherein the instructions, when executed by the processor circuit, cause the system to:
    access navigation data indicative of sequencing and spatial relationships among a plurality of media hotspots, with each hotspot being included within a medium and including a spatial address;
    receive, via a network, data indicative of a mobile device's detection of a covert target hotspot and to display the covert target hotspot via a display of the mobile device;
    determine based on the navigation data a recommendation for navigation to an associated hotspot that is an immediate predecessor or successor relative to the covert target hotspot; and
    provide the recommendation to the mobile device for display.

2. The non-transitory computer readable medium of claim 1, wherein the instructions trigger an information display relating to a subject of the medium at the display of the mobile device when each hotspot is detected by way of a camera of the mobile device, wherein the covert target hotspot is imperceptible to a naked human eye.

3. The non-transitory computer readable medium of claim 1, wherein the recommendation includes instructions to present a directional arrow in the display of the mobile device, the arrow to point from the covert target hotspot toward the associated hotspot.

4. The non-transitory computer readable medium of claim 1, wherein the instructions cause the mobile device to utilize the recommendation to cause presentation of a directional arrow in the display of the mobile device, the arrow to point from the covert target hotspot toward the associated hotspot.

5. The non-transitory computer readable medium of claim 1, wherein the instructions further cause the system to determine an explicit path through a subset of the plurality of hotspots, and to provide the path with the recommendation as part of the display.

6. The non-transitory computer readable medium of claim 1, wherein the instructions further cause the system to:
    determine a plurality of subject-specific path options involving subsets of the plurality of hotspots, and to provide the options to the mobile device for display; and
    responsive to a receipt of a request for a first subject-specific path from the options, provide the first path including the recommendation.

7. The non-transitory computer readable medium of claim 1, wherein the covert target hotspot and the associated hotspot are included within the same medium.

8. The non-transitory computer readable medium of claim 1, wherein the plurality of media hotspots are distributed across a plurality of media, and wherein the covert target hotspot is included within a first medium among the plurality of media, and the associated hotspot is included within a second medium among the plurality of media.

9. The non-transitory computer readable medium of claim 1, wherein each of the plurality of media hotspots is covert, such that the plurality of media hotspots are imperceptible to a naked human eye.

10. The non-transitory computer readable medium of claim 1, wherein each of the plurality of media hotspots is covert such that the plurality of media hotspots is imperceptible to a naked human eye from a plurality of angles and distances.

11. A system to provide media navigation recommendations, comprising:
    a request engine, to access navigation data indicative of sequencing and spatial relationships among a plurality of media hotspots, with each hotspot being included within a medium and including a spatial address;
    a detection data engine, to receive, via a network, data indicative of a mobile device's detection of a covert target hotspot via a camera and to provide a display of the covert target hotspot via a display of the mobile device;
    a determination engine to determine based on the navigation data a recommendation for navigation to an associated hotspot that is an immediate predecessor or successor relative to the covert target hotspot;
    a recommendation engine, to, responsive to the determination, provide the recommendation to the mobile device for display via the display of the mobile device; and
    wherein the recommendation includes instructions for presentation of directional information in the display, and further wherein each of the engines and the mobile device include circuitry.

12. The system of claim 11, wherein the plurality of media hotspots are distributed across a plurality of media, and wherein the covert target hotspot is included within a first medium among the plurality of media, and the associated hotspot is included within a second medium among the plurality of media.

13. The system of claim 11, wherein the determination engine is to receive data indicative of relative popularity of the plurality of media hotspots according to user preferences or user navigation among the media hotspots, and determine the recommendation based on the relative popularity data.

14. The system of claim 11, wherein the recommendation is a first recommendation and the determination engine is to:
- determine identity of a first user at the mobile device that is interacting with the display;
- receive a second recommendation for a hotspot, the second recommendation made by a second user that is a social media friend of the first user; and
- determine the first recommendation based on the second recommendation.

15. The system of claim 11, wherein the determination engine is to receive data indicative of a time budget for a user, and wherein the recommendation is determined based upon the time budget.

16. The system of claim 15, wherein the determination engine is to receive the data indicative of the time budget from another device, the data being associated with calendar information of the user stored on the other device, and is to determine the recommendation for the navigation to the associated hotspot based on the navigation data and the time budget.

17. A method to provide media navigation recommendations, comprising:
- acquiring, via a graphic user interface, establishment data that specifies a plurality of media hotspots to be incorporated within a medium and receiving spatial addresses for hotspots, such that the establishment data is interpretable by interpretive programming of a mobile device to detect a covert target hotspot among the plurality of media hotspots; and
- acquiring, via a graphic user interface, navigation data indicative of sequencing and spatial relationships among the plurality of media hotspots, such that the navigation data is usable by a server to determine a recommendation for navigation from the covert target hotspot to an associated hotspot.

18. The method of claim 17, further comprising acquiring via a graphic user interface a description of a directional indicator to be displayed at the mobile device, the directional indicator to point to the associated hotspot, and further wherein the associated hotspot is covert.

19. The method of claim 17, wherein each of the plurality of media hotspots is covert such that the plurality of hotspots is imperceptible to a human eye.

20. The method of claim 17, further including:
- receiving data indicative of a time budget from the mobile device, the data being associated with calendar information of a user stored on the mobile device; and
- determining a recommendation for navigation to the associated hotspot based on the navigation data and the time budget.

* * * * *